(12) United States Patent
Commander et al.

(10) Patent No.: US 8,684,415 B2
(45) Date of Patent: Apr. 1, 2014

(54) SUBSTRATES

(75) Inventors: Lawrence Commander, Reading (GB); Adam Jeacock, Southampton (GB); Carole Lesley Foster, Berkshire (GB)

(73) Assignee: De La Rue International Limited, De La Rue House, Jays Close, Basingstoke, Hampshire (GB)

( * ) Notice: Subject to any disclaimer, the term of this patent is extended or adjusted under 35 U.S.C. 154(b) by 709 days.

(21) Appl. No.: 12/301,922

(22) PCT Filed: May 25, 2007

(86) PCT No.: PCT/GB2007/001966
§ 371 (c)(1),
(2), (4) Date: Jan. 23, 2009

(87) PCT Pub. No.: WO2007/138293
PCT Pub. Date: Dec. 6, 2007

(65) Prior Publication Data
US 2010/0231846 A1   Sep. 16, 2010

(30) Foreign Application Priority Data
May 26, 2006   (GB) .................................. 0610539.9

(51) Int. Cl.
*B42D 15/00* (2006.01)
(52) U.S. Cl.
USPC .................................. 283/72; 283/91; 283/94
(58) Field of Classification Search
USPC ...................................................... 283/91, 94
See application file for complete search history.

(56) References Cited

U.S. PATENT DOCUMENTS

| | | | |
|---|---|---|---|
| 1,996,539 A | 4/1935 | Dufay | |
| 5,678,863 A | 10/1997 | Knight et al. | |
| 6,183,018 B1 * | 2/2001 | Braun et al. | 283/94 |
| 6,712,397 B1 | 3/2004 | Mayer et al. | |
| 2005/0083467 A1 | 4/2005 | Lee et al. | |

(Continued)

FOREIGN PATENT DOCUMENTS

| | | |
|---|---|---|
| CA | 2577208 A1 | 3/2006 |
| DE | 102004039355 A1 | 2/2006 |

(Continued)

OTHER PUBLICATIONS

UK Patent Office, "Search Report Under Section 17," UK Patent Office, (Mar. 5, 2007).

(Continued)

*Primary Examiner* — Kyle Grabowski
(74) *Attorney, Agent, or Firm* — GableGotwals

(57) ABSTRACT

The present invention relates to improvements in security devices that can be used in varying shapes and sizes for various authenticating or security applications, particularly an optically variable security device utilizing liquid crystal materials. The security device includes a liquid crystal layer (11), an at least partially absorbing layer (12) adjacent at least a part of one side of the liquid crystal layer (11), and at least one customizing region (13) which is adjacent at least a part of an opposite side of the liquid crystal layer (11) to the absorbing layer (12) in selected regions. The at least one customizing region (13) modifies the color shifting properties of the liquid crystal layer (11) such that at least two contrasting optically variable regions are provided by the regions covered by the at least one customizing region and regions not covered by the at least one customizing region.

36 Claims, 9 Drawing Sheets

(56) References Cited

U.S. PATENT DOCUMENTS

| | | | |
|---|---|---|---|
| 2005/0116464 A1* | 6/2005 | Isherwood et al. | 283/72 |
| 2005/0151368 A1 | 7/2005 | Heim | |
| 2006/0023132 A1 | 2/2006 | Mengel et al. | |
| 2006/0151989 A1* | 7/2006 | Muke et al. | 283/91 |
| 2007/0241553 A1* | 10/2007 | Heim et al. | 283/91 |
| 2007/0273146 A1* | 11/2007 | Davis et al. | 283/91 |

FOREIGN PATENT DOCUMENTS

| | | |
|---|---|---|
| DE | 10200409118 | 4/2006 |
| EP | 1227347 A1 | 7/2002 |
| EP | 1327895 | 7/2003 |
| EP | 1700707 A1 | 9/2006 |
| EP | 1722255 A1 | 11/2006 |
| WO | WO98/20382 | 5/1998 |
| WO | WO03/053713 | 7/2003 |
| WO | WO03/061980 | 7/2003 |
| WO | WO2004028824 A2 | 4/2004 |
| WO | WO2004/050991 A1 | 6/2004 |
| WO | WO2004/095090 | 11/2004 |
| WO | WO2005/005727 | 1/2005 |
| WO | WO 2005/005727 A1 | 1/2005 |
| WO | WO 2005/063495 A1 | 7/2005 |
| WO | WO2005/080089 A1 | 9/2005 |
| WO | WO 2005/105474 A2 | 11/2005 |
| WO | WO2006/007742 A1 | 1/2006 |
| WO | WO/2006/040069 * | 4/2006 |

OTHER PUBLICATIONS

European Patent Office, "Notification of Transmittal of the International Search Report and the Written Opinion of the International Searching Authority," European.

European Patent Office, "Notification of Transmittal of the International Preliminary Report on Patentability," European Patent Office, (Aug. 26, 2008).

Berreman, "Solid Surface Shape and the Alignment of an Adjacent Nematic Liquid Crystal," Phys Rev Lett 23, 1683-1686 (1972) (FM-3).

* cited by examiner

SUBSTRATES

CROSS-REFERENCE TO PENDING APPLICATIONS

This application is based on PCT Patent Application No. GB2007/0001966, filed on May 25, 2007, which was based on and claimed priority to United Kingdom Patent Application No. 0610539.9, filed May 26, 2006.

The present invention relates to improvements in security devices that can be used in varying shapes and sizes for various authenticating or security applications, particularly an optically variable security device utilising liquid crystal materials.

The increasing popularity of colour photocopiers and other imaging systems, and the improving technical quality of colour photocopies, has led to an increase in the counterfeiting of bank notes, passports, fiscal stamps, authentication labels and identification cards etc. There is, therefore, a need to add additional authenticating or security features to existing features. Steps have already been taken to introduce optically variable features into such documentation that cannot be reproduced by a photocopier. There is also a demand to introduce features which are discernible by the naked eye but which are "invisible" to, or viewed differently by, a photocopier. Since a photocopying process typically involves scattering high energy light off an original document containing the image to be copied, one solution would be, to incorporate one or more features into the document which have a different perception in reflected and transmitted light, an example being watermarks and enhancements thereof.

It is known that certain liquid crystal materials exhibit a difference in colour when viewed in transmission and reflection as well as an angularly dependent coloured reflection. Liquid crystal materials have been incorporated into documents, identification cards and other security elements with a view to creating distinctive optical characteristics. EP-A-0435029 is concerned with a data carrier, such as an identification card, which comprises a liquid crystal polymer layer or film in the data carrier. The liquid crystal polymer is in solid form at room temperature and is typically within a laminate structure. The intention is that the liquid crystal layer, which is applied to a black background, will demonstrate a high degree of colour purity in the reflected spectrum for all viewing angles. Automatic testing for verification of authenticity is described using the wavelength and polarization properties of the reflected light in a single combined measurement. This has the disadvantage of being optically complex using a single absolute reflective measurement requiring a uniform liquid crystal area on a black background.

AU-A-488,652 is also concerned with preventing counterfeit copies by introducing a distinctive optically-variable feature into a security element. This patent discloses the use of a liquid crystal "ink" laminated between two layers of plastic sheet. The liquid crystal is coated onto a black background so that only the reflected wavelengths of light are seen as a colour. The patent specification is primarily concerned with thermochromic liquid crystal materials, which have the characteristic of changing colour with variation in temperature.

Cholesteric liquid crystals have certain unique properties in the chiral nematic phase. It is the chiral nematic phase which produces an angularly dependent coloured reflection and a difference in colour when viewed in either transmission or reflection. Cholesteric liquid crystals form a helical structure which reflects circularly polarised light over a narrow band of wavelengths. The wavelength is a function of the pitch of the helical structure which is formed by alignment within the liquid crystal material. An example of such a structure is depicted in FIG. 1 with the cholesteric helical axis in the direction of the arrow X.

The reflection wavelength can be tuned by appropriate choice of chemical composition of the liquid crystal. The materials can be chosen to be temperature sensitive or insensitive. Both handednesses of circularly polarised light can be reflected by choice of the correct materials and thus high reflectivities at specific wavelengths can be achieved with double layers of liquid crystals. The wavelength of reflected light is also dependent on the angle of incidence, which results in a colour change perceived by the viewer as the device 10 is tilted (FIG. 2).

On a dark background, only the reflective effect is observed, since little light is being transmitted from behind. When the dark background is removed or not present and the device 10 is viewed in transmission, the intensity of the transmitted colour saturates the reflective colour. Of the light which is not reflected, a small proportion is absorbed and the remainder is transmitted through the liquid crystal material. When correctly configured there is a dramatic change between the transmitted colour in the direction of arrow Y and reflected colour in the direction of arrow Z (FIG. 3). The region on either side of the liquid crystal layer in FIG. 3 is a transparent polymer or glass. The transmitted and reflected colours are complementary, for example, a green reflected colour produces a magenta transmitted colour.

Liquid crystal materials can be incorporated into security devices either as a non-pigmented coating applied as a uniform film, as for example in WO-A-03061980, or in the form of an ink as a liquid crystal pigment in an organic binder, as for example in EP-A-1156934. The advantage of a liquid crystal ink is that it can be applied using conventional printing processes and it is therefore relatively straightforward to apply the liquid crystal material in the form of a design. However the colour purity, brightness and sharpness of the observed colour and colour-shift are significantly degraded for a pigmented liquid crystal ink compared to a liquid crystal layer. This degradation is due to the variability in alignment of the cholesteric helical axis between the individual liquid crystal pigments compared to the uniform alignment of the liquid crystal layer.

A disadvantage with the use of liquid crystal films in the security devices described in the prior art is that the production route requires several steps, such as coating the liquid crystal polymer on a carrier substrate, and then transferring the formed liquid crystal polymer film from the carrier substrate to the substrate of the security device. It is neither straightforward nor cost-effective to customise the base liquid crystal layer for each security application.

It is known in the prior art to customise security devices comprising liquid crystal layers by modifying the absorbing layer under the liquid crystal layer. For example in EP0435029 the security device is customised by applying a black printed image under the liquid crystal layer. In WO03061980 the liquid crystal security thread is customised by the introduction of demetallised characters using a dark resist. WO03061980 discloses a method for manufacturing a security substrate, which combines the use of demetallised indicia with the colourshift effect of liquid crystal materials.

EP-A-1700707 describes a discrimination medium comprising a cholesteric liquid crystal layer or a multilayer film onto which is applied an opaque printed layer such that the gaps in the printed layer forms an image which changes colour depending on the viewing angle. The printed layer simply conceals the liquid crystal film and does not modify the colourshifting characteristics of the liquid crystal layer.

DE-A-102004039355 describes a security device comprising two liquid crystal materials where in certain regions the additive colour-mixing of the reflection spectrum of the two layers of the cholesteric liquid-crystalline material allows for the creation of broader and unusual colour tilt effects.

The customised liquid crystal devices described in the prior art, where the customising regions is not an expensive additional liquid crystal layer, are limited in that they do not modify the colourshifting characteristics of the liquid crystal layer. The current invention enables a liquid crystal layer to be easily customised such that at least two regions are created with contrasting colourshifting properties without using additional expensive liquid crystal layers.

The present invention is for a security device comprising a liquid crystal layer, an at least partially absorbing layer co co-extensive with or applied to at least a part of one side of the liquid crystal layer, and at least one customising region which is co-extensive with or applied to at least a part of an opposite side of the liquid crystal layer to the absorbing layer in selected regions, wherein said at least one customising region modifies the colour shifting properties of the liquid crystal layer such that at least two contrasting optically variable regions are provided by the regions covered by the at least one customising region and regions not covered by the at least one customising region.

The modification of the colourshifting properties of the liquid crystal layer is apparent to the observer as a change in the angle of view at which the different colours are observed. The viewing angle can be varied by tilting and/or rotating the device.

The customising region does not block light travelling to and from the liquid crystal layer i.e. the customising region is at least semi-transparent and preferably has no colourshifting properties itself.

In a preferred form of the present invention, the liquid crystal layer is present as a film. However, the invention is not limited to the use of films and the liquid crystal layer can be provided in other forms, for example by a pigmented liquid crystal coating.

If the liquid crystal layer is in the form of a film the security device of the present invention benefits from the excellent optical properties of a liquid crystal layer, whilst retaining the design flexibility of a pigmented ink.

The invention will now be described, by way of example only, with reference to, and as shown in the accompanying drawings in which:—

Figure 1:
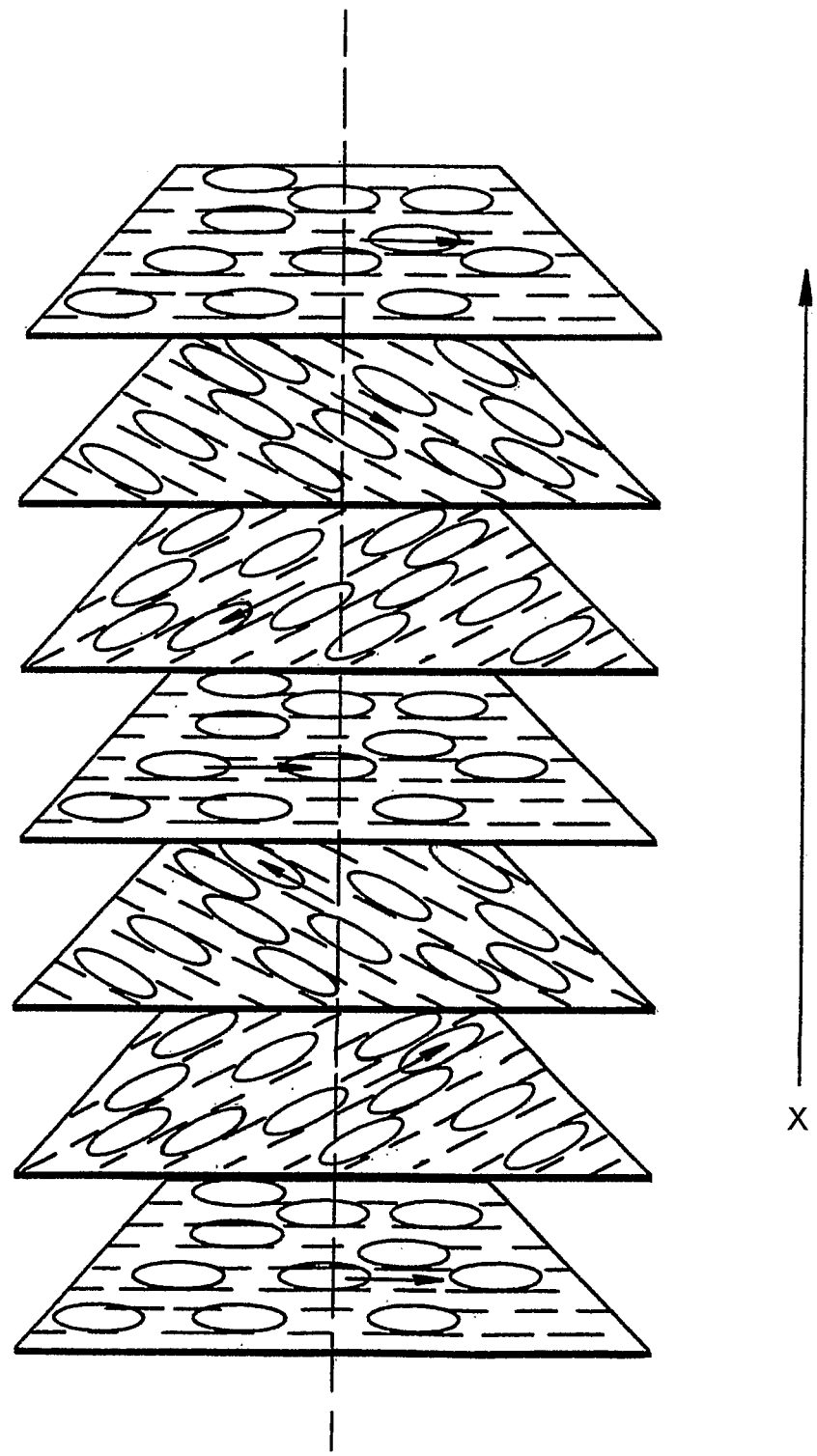
FIG. 1 depicts chiral nematic alignment of a cholesteric liquid crystal material.
Figure 2:
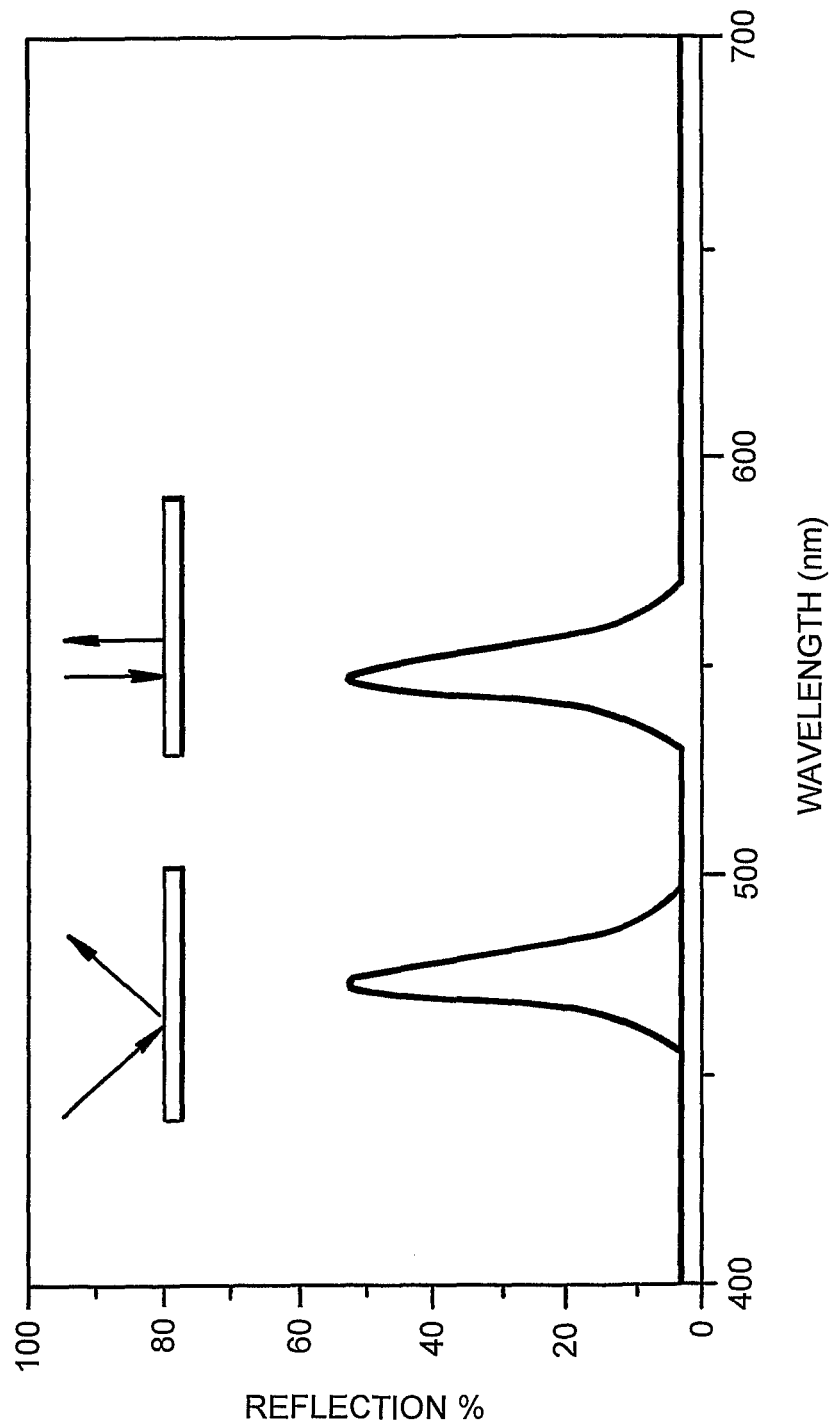
FIG. 2 shows how the reflection from a cholesteric liquid crystal material varies with the angle of incidence.
Figure 3:
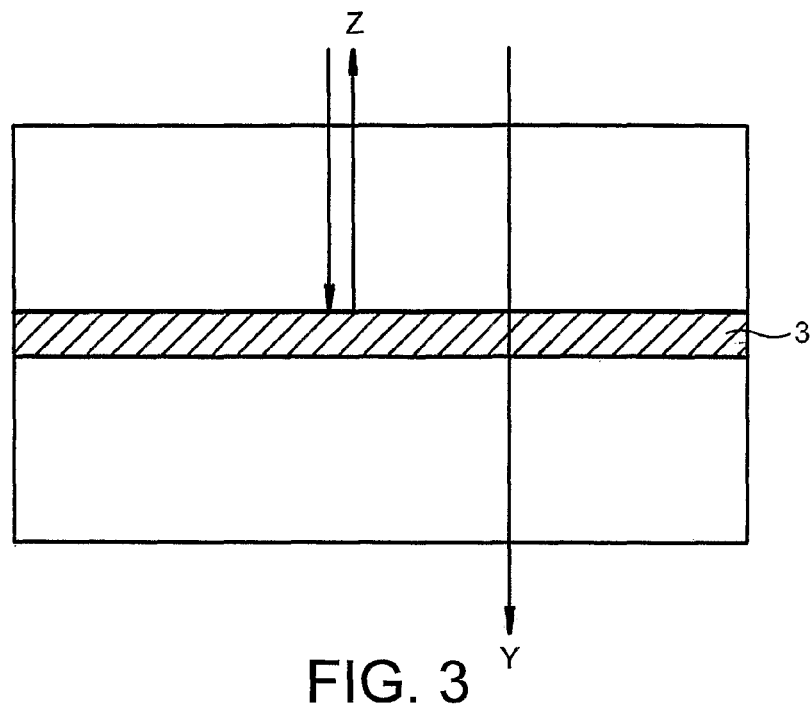
FIG. 3 depicts the transmission and reflection of light incident on a liquid crystal material.
Figure 4:
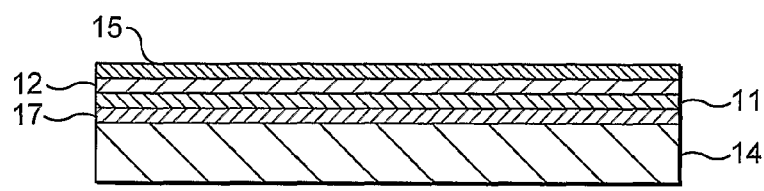
FIG. 4 is a cross-sectional end elevation of a security device prior to application of a customising region on a transfer substrate prior to application to a base substrate.
Figure 5:
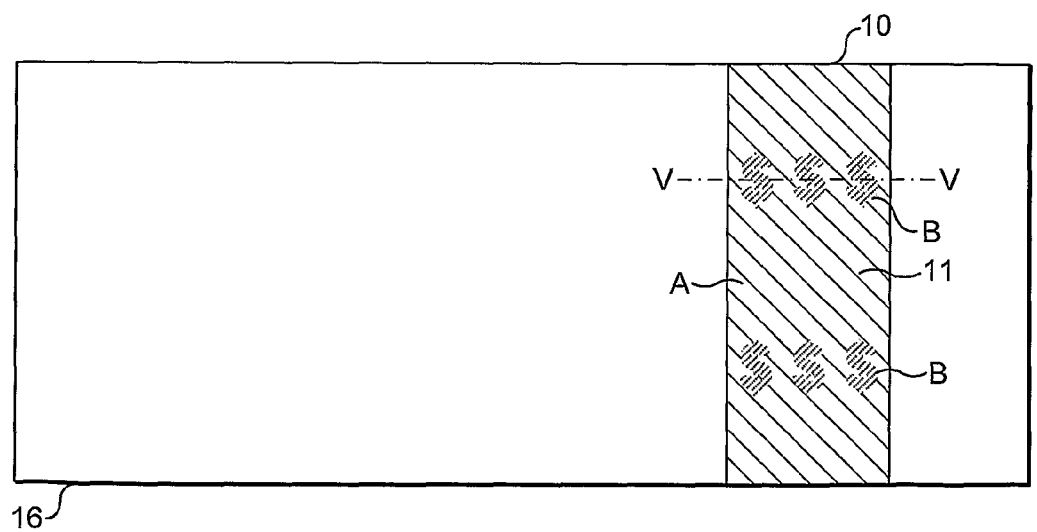
FIG. 5 is a plan view of a security device with the customising region and applied to a base substrate according to the present invention.
Figure 6:
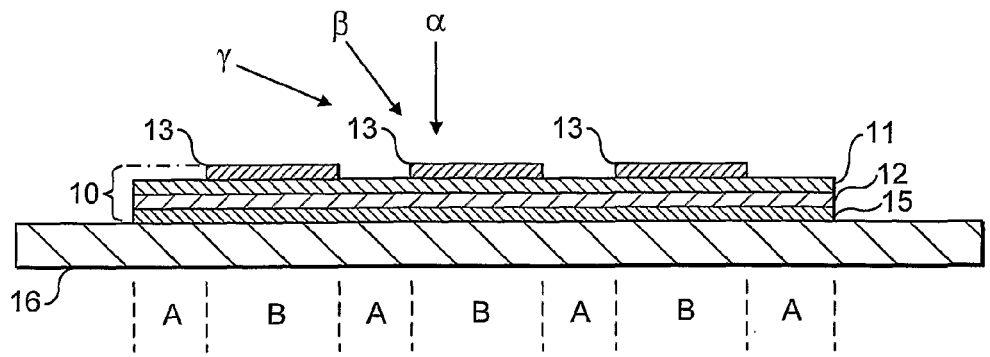
FIG. 6 is a cross-sectional end elevation of the security device of FIG. 5 after application to a base substrate, taken on the line V-V on FIG. 5.

Referring to FIGS. 4 to 6, a security device 10 formed in accordance with the present invention for protecting a document of value, made from a security substrate 16 comprises a liquid crystal layer 11, an absorbing layer 12, which is co-extensive with at least a part of the liquid crystal layer 11 and a customising region 13. The customising region 13 is co-extensive with, and preferably applied directly to, at least a part of the liquid crystal layer 11 for customising the device 10 by modifying the colour shifting properties of the liquid crystal layer 11.

The device 10 may be applied to or incorporated into security substrates 16 or secure documents in any of the conventional methods known in the prior art, for example as a patch, foil, stripe, strip or thread. The liquid crystal layer 11 may be arranged either wholly on the surface of the document, as in the case of a stripe or patch, or may be visible only partly on the surface of the document in the form of a windowed security thread. Security threads are now present in many of the world's currencies as well as vouchers, passports, travellers' cheques, identity cards, authentication labels, postal stamps and other documents. In many cases the thread is provided in a partially embedded or windowed fashion where the thread appears to weave in and out of the paper. Methods for producing paper with so-called windowed threads can be found in EP-A-0059056 and EP-A-0860298.

In one embodiment, the device 10 may be incorporated into a document such that regions of the device 10 are viewable from both sides of the document. Methods for incorporating a security device 10 such that it is viewable from both sides of the document are described in EP-A-1141480 and WO-A-03054297. In the method described in EP-A-1141480, one side of the device 10 is wholly exposed at one surface of the document in which it is partially embedded, and partially exposed in windows at the other surface of the substrate.

In the case of a stripe or patch, the liquid crystal layer 11 may be provided in the form of a film formed by coating, printing, transferring or laminating a liquid crystal material onto a carrier substrate 14. In one example a liquid crystal material can be gravure printed onto the carrier substrate using a printable polymerisable liquid crystal material as described in US-A-20040155221. The film is then transferred to the security substrate 16 in a subsequent working step. The device 10 can be applied to the security substrate 16 using an adhesive layer 15. The adhesive layer 15 is applied to either the liquid crystal layer 11, or the surface of the security substrate 16 to which the device 10 is to be applied. After transfer, the carrier substrate 14 may be removed, leaving the security device 10 as the exposed layer. Alternatively the carrier layer 14 can remain as part of the structure acting as an outer protective layer.

In addition to an adhesive layer 15 a primer layer may also be added to a security substrate 16 during the transfer process of a stripe. The primer layer may contain functional components that react to an external stimulus. Components of this type include, but are not limited to, fluorescent, phosphorescent, infrared absorbing, thermochromic, photochromic, magnetic, electrochromic, conductive and piezochromic. The primer layer may also extend beyond the applied stripe such that any visual effects in the primer layer can be viewed as a strip running parallel to the applied stripe.

Following the application of the security device 10, the security substrate 16 undergoes further standard security printing processes to create a secure document, including one or all of the following; wet or dry lithographic printing, intaglio printing, letterpress printing, flexographic printing, screen printing, and/or gravure printing. In one aspect of the present invention, customisation of the liquid crystal layer 11 takes place at the same time, and preferably using the same equipment, as the standard security printing processes.

In the following examples the security device 10 is applied to the secure substrate 16 as a stripe, but in each case, unless stated, the invention is equally applicable to patches, windowed security threads and partially elongate elements that are viewable from either side of the document.

In a preferred embodiment of the invention the customising region 13 is applied after the security device has been applied to the secure substrate. This enables the customised regions of the liquid crystal layer 11 to be easily registered to the adjacent security features on the substrate 16.

FIG. 4 is a cross-sectional view of a security device 10 prior to application of customising region 13, the device 10 being suitable for application to a security substrate 16 as a stripe. The device 10 is formed on a carrier substrate 14, which may be coated with an optional release layer 17, onto which is applied a liquid crystal material forming a uniform liquid crystal layer 11. The liquid crystal layer 11 can be formed on the carrier layer 14 by coating or printing a polymeric liquid crystal material and then curing to form a film or by transferring or laminating an already formed liquid crystal layer 11 onto the carrier substrate 14. An absorbing layer 12 is then printed over the liquid crystal layer 11. An adhesive layer 15 is applied to the absorbing layer 12 and the device 10 is ready to be transferred to a security substrate 16, such as a banknote.

In one embodiment of the invention, as shown in FIGS. 5 and 6, the customisation of the security device 10 is achieved by applying a customising region which is a scattering layer 13, in the form of a design, to the exposed liquid crystal layer 11. In a preferred embodiment the scattering layer 13 takes the form of a matt varnish or lacquer which can be applied using one of the standard security printing processes. In this context a matt varnish or lacquer is one that reduces the gloss of the liquid crystal layer 11 by scattering the light reflected from the liquid crystal layer 11. One example of a suitable matt varnish is a suspension of fine particles in an organic resin. The surface particles scatter the light as it passes through the varnish resulting in a matt appearance. The scattering process can be enhanced by the particles migrating to the surface of the varnish or lacquer when it is applied to the liquid crystal layer 11. A suitable varnish for the present invention is "Hi-Seal O 340" supplied by Hi-Tech Coatings Ltd. In an alternative solution the fine particles can be replaced by organic waxes. As a further alternative, the scattering layer 13 can be generated by embossing a matt structure into the surface of a liquid crystal layer. Suitable embossed matt structures are described in WO-A-9719821. The scattering layer modifies the colourshifting properties of the liquid crystal layer 11 such that two contrasting optically variable regions can be defined as follows:

Region A—Liquid crystal layer 11 over absorbing layer 12. In this region the reflective colourshift of the liquid crystal layer 11 is observed i.e. the wavelength of reflected light is dependent on the angle of incidence, which results in a colour change perceived by the viewer as the device 10 is tilted, for example red to green as the device 10 is tilted away from the normal.

Region B—Light scattering layer 13 above Region A. In this Region, the scattering layer 13 modifies the appearance of the colourshifting liquid crystal layer 11. The liquid crystal layer 11 has a uniform surface which exhibits negligible scattering of light and, for the situation where there is directed white light illumination from a distant light source, the incident light undergoes specular reflection and a high gloss surface is observed the colour of which is dependent on the angle of the viewing direction relative to the substrate. The scattering layer 13 modifies the surface of the liquid crystal layer 11 such that the reflection is now more diffuse reducing the glare of the liquid crystal layer 11 and changing the angular range over which the respective colours of the security device 10 are easily viewable to the authenticator. For example, if the liquid crystal material exhibits a red to green colourshift the switch from red to green occurs closer to normal incidence for Region B compared to Region A.

In two further embodiments shown in FIGS. 7 and 8, and 9 and 10 respectively, the absorbing layer 12 is applied in the form of a design and by combining with the scattering layer 13 enables the creation of two further visually distinct regions that can be defined as follows:

Region C—In this region the absorbing layer is absent providing an optically variable region comprising liquid crystal over base substrate 16, for example paper or an opaque polymeric coating on a transparent polymeric substrate. In this example an optional transparent adhesive 15 is provided between the liquid crystal film 11 and the base substrate 16. Where the absorbing layer 12 is absent, the intensity of the transmitted colour through the liquid crystal layer 11 saturates the reflective colour. The transmitted and reflected colours are complementary, for example, a red to green colourshift in reflection is seen as a cyan to magenta colourshift in transmission. Therefore in Region C the light transmitted through the liquid crystal layer 11 is observed against a predominantly white background of the substrate 16 and gives the substrate 16 a noticeable tint of colour which exhibits a complementary colour shift to Region A. For example, if Region A exhibits a red to green colourshift Region B will exhibit a complementary cyan to magenta colourshift.

Region D—Light scattering layer applied over Region C—The scattering layer 13 effectively reduces the colourshifting effect of the liquid crystal layer 11 over transparent adhesive 15 and the substrate 16. The colourshift is still present, but effectively invisible to the naked eye.

Whilst the use of a black, or very dark, substantially totally absorbing layer 12 may give rise to the most strong colourshift effects, other effects may be generated by the use of a partially absorbing layer 12 of other colour or a combination of colours, giving rise to differing apparent colourshift colours. The use of partially absorbing layers 12 of different colours enables the number of optically variable regions to be increased further. The absorbing layer 12 of the present invention may comprise a pigmented ink or coating or alternatively a non-pigmented absorbing dark dye can be used. The absorbing layer may also comprise a dyed polymeric film such as dyed PET (polyethylene terephthalate).

The use of these different optically variable regions will now be described further by use of the examples below.

Referring back to FIGS. 5 and 6 which illustrate the security device 10 transferred to a plain, substantially white security substrate 16. The scattering layer 13 in the form of a matt varnish is applied after transfer in the form of a design which cooperates with the liquid crystal layer 11 to form optically variable regions A and B. In region A the liquid crystal layer 11 lies over the absorbing layer 12 defining the background, and in region B scattering layer 13 lies over the liquid crystal layer 11, which already lies over the absorbing layer 12, defining the dollar symbol. For the purpose of this example the liquid crystal layer 11 exhibits a red-green colourshift when viewed in reflection over a dark absorbing layer 12.

However the invention is not limited to this colourshift and any colourshifting liquid crystal layer 11 can be used.

On viewing the security device 10 under ambient lighting conditions and from normal incidence (viewing direction α in FIG. 6) the background region A and region B both appear red due to the reflected light of the liquid crystal layer 11. However, at normal incidence the intensity of the specular reflection from region A is less than the intensity of the diffuse reflection from region B, and therefore region B appears lighter than region A and the two regions are visually distinct.

On changing the viewing direction from normal incidence (viewing from α through β to γ), the reflected light of the liquid crystal layer 11, present in regions A and B, switches from red to green. The matt varnish of the scattering layer 13 in region B scatters the reflected light and increases the angular range at which the green colour is observed and therefore the switch from red to green occurs closer to normal incidence for region B compared to region A. With reference to FIG. 6, region B will switch from red to green at viewing direction β and region A will switch from red to green at viewing direction γ.

The customised security device 10 in FIGS. 5 and 6 comprises two colourshifting regions which are clearly distinct from each other due to the different angles of view at which the colourshift occurs. In addition to this, the optically variable nature of the security device 10 is further enhanced by the difference in gloss between regions A and B. As the angle of view is changed, the intensity of the diffuse reflected light in region B remains constant but the intensity of the specular reflection from region A varies such that it is either equal to, less than or greater than the intensity of the diffuse reflection from region B. The angular range at which these conditions occur depends on the lighting conditions but on tilting the sample in ambient conditions an angle of view can be located such that the intensity of regions A and B are the same and therefore indistinguishable and where the intensity of region A is greater than region B and vice-versa. Therefore on tilting the device 10 shown in FIGS. 5 and 6, the dollar symbol will appear to come in and out of view depending on the degree of specular reflection from the background liquid crystal layer 11.

The designs generated by the customisation are preferably in the form of images such as patterns, symbols and alphanumeric characters and combinations thereof. The designs can be defined by patterns comprising solid or discontinuous regions which may include for example line patterns, fine filigree line patterns, dot structures and geometric patterns. Possible characters include those from non-Roman scripts of which examples include but are not limited to, Chinese, Japanese, Sanskrit and Arabic.

Figure 7:
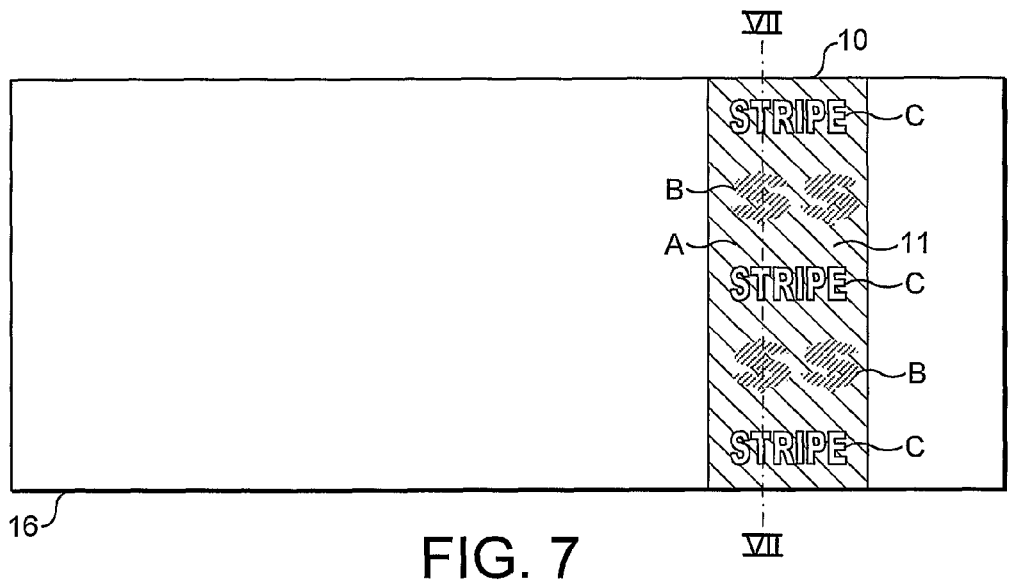
FIGS. 7 and 9 are plan views of an alternative security device.
Figure 8:
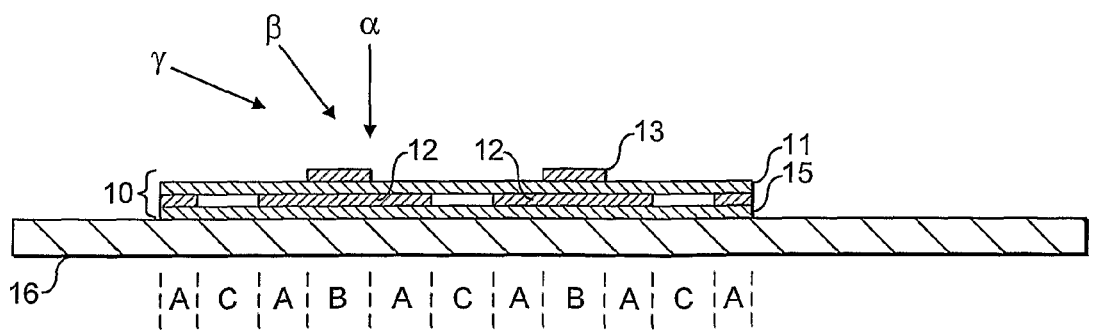
FIGS. 8 and 10 are cross-sectional side elevations of the security devices of FIGS. 7 and 9 respectively, taken on the lines VII-VII and IX-IX respectively.

FIGS. 7 and 8 illustrate an alternative embodiment of a security device 10 to that shown in FIGS. 5 and 6. As in the previous embodiment the liquid crystal layer 11 exhibits a red to green colourshift when viewed in reflection over a dark absorbing layer 12. In this example, the dark absorbing layer 12 is in the form of a design and cooperates with the liquid crystal layer 11 and the matt varnish of the scattering layer 13 to form an additional optically variable region C. The dark absorbing layer 12 is omitted from certain regions such that in region C the liquid crystal layer 11 is directly over the transparent adhesive 15 and the base substrate 16 defining the repeating pattern of the word "STRIPE".

Region C, when viewed from normal incidence, appears similar to the substrate 16 but is tinted cyan by the transmitted light of the liquid crystal layer 11. On changing the viewing direction from normal incidence (viewing from α through β to γ) the transmitted light, present in region C, switches from cyan to magenta. The colours present in region C, resulting from the light transmitted through the liquid crystal layer 11, are the complementary colours to the reflected light colours observed in region A.

The customised security device 10 of FIGS. 7 and 8 comprises three colourshifting regions A, B and C, which are clearly distinct from each other. Region A is distinct from Region B due to the different angles of view at which the colourshifts occur and Region C exhibits a complementary colourshift to Regions A and B. In addition to this, the optically variable nature of the device 10 is further enhanced by the difference in gloss between Regions A and B as described with reference to FIGS. 5 and 6. In addition for the viewing direction where the specular reflection is at its most intense the glare from Region A saturates the localised areas of the tinted substrate in Region C, resulting in the designs defined by Regions C being hidden from view. For this to be most effective it is preferable that the individual design elements for Region C, for e.g. alphanumeric characters, have an area of less than 30 mm$^2$.

In summary the device 10 shown in FIGS. 7 and 8 comprises three viewing Regions A,B,C which exhibit contrasting colourshifts and, in addition, two of the Regions B,C are substantially invisible at certain angles of view resulting in a device 10 which is striking and memorable to the general public but very complex for a potential counterfeiter to try to reproduce.

Figure 9:
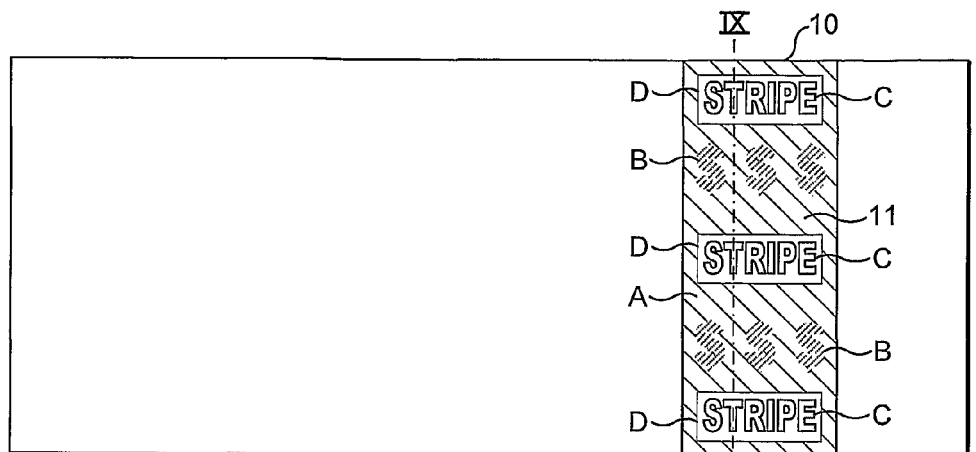
Figure 10:
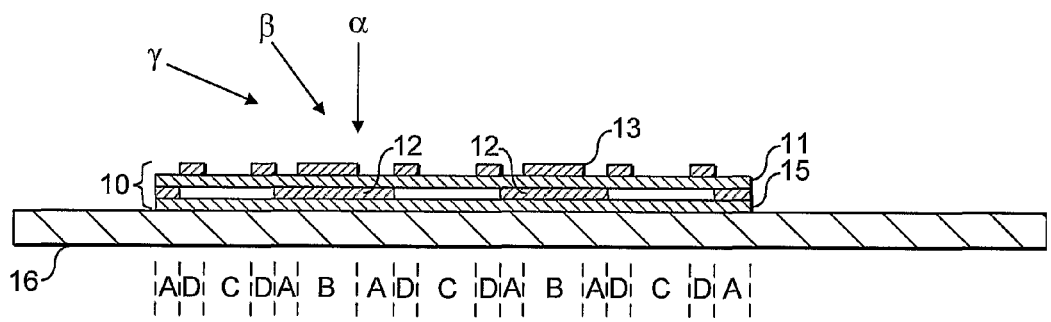

FIGS. 9 and 10 illustrate a further embodiment of the invention in which the security device 10 is customised by the localised application of a matt varnish which forms the scattering layer 13. The dark absorbing layer 12 and the matt varnish are applied in the form of designs and cooperate with the liquid crystal layer 11 to form optically variable Regions A, B and C as described with reference to FIGS. 7 and 8. In this embodiment, a further region D is formed where the matt varnish is applied over sections of the liquid crystal layer 12 that is just over the transparent adhesive 15 and the base substrate 16, defining a box around the word "STRIPE". The matt varnish effectively negates the colourshifting effect of the liquid crystal layer 11 over the transparent adhesive 15 and the base substrate 16 and the colour of the substrate 16, preferably substantially white, will be visible in this Region D irrespective of viewing direction. In fact the colourshifting effect is still occurring in Region D but is not apparent to the naked eye. Therefore, on tilting the device 10 shown in FIGS. 9 and 10 the word "STRIPE" (Region C) will switch from a cyan tinted substrate colour to a magenta tinted substrate colour, while the surrounding box (Region D) will have the colour of the untinted substrate 16.

The switch from cyan to magenta is not instantaneous and the colours are difficult to see with the naked eye close to the switching angle and therefore for angles of view close to the switching angle Regions C and D are indistinguishable. Viewing at normal incidence, the word "STRIPE" appears cyan, and then on tilting away from the normal incidence disappears into the white background of the box, before reappearing on further tilting but now in the colour magenta.

The matt varnish of the scattering layer 13 can be applied at the same time as the traditional security printing on the substrate 16 using any of the standard security printing processes including one or all of the following; wet or dry lithographic printing, intaglio printing, letterpress printing, flexographic printing, screen printing, and/or gravure printing. For example the matt varnish can replace one of the colours on a litho or intaglio printing press or be printed using an additional unit on a gravure or flexographic printing press. The fact that the varnish is applied during the same printing process as the surrounding substrate 16 printing means that the tight registrational tolerances, which are standard between different colours on the substrate 16, can be achieved between the customised images on the applied security device 10 and the traditional security printing on the substrate 16.

It should also be noted that the customising region 13 could also be applied before the security device 10 is applied to the secure substrate 16. This is more appropriate where the application of the security device 10 to the secure substrate 16 does not involve transferring the liquid crystal layer 11 from a carrier layer. For example, in the case of a security thread the customising region 13, in the form of a light scattering matt varnish, could be applied by gravure printing during the production of the security thread.

Figure 11:
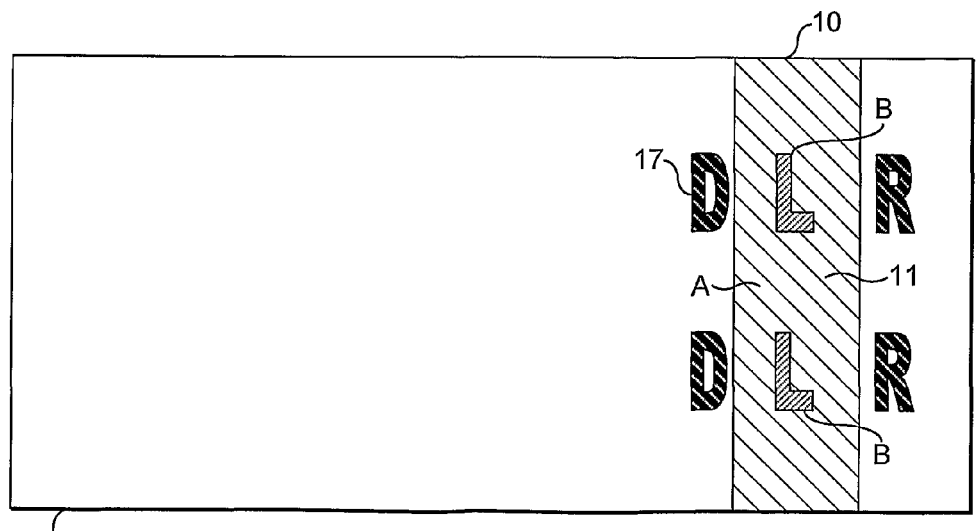
FIGS. 11 to 17 are plan views of further alternative security devices applied to a substrate.

FIG. 11 shows an example where the customised image is registered to a security feature 17, in the form of printing, on the security substrate 16. As before, a matt varnish is applied to form the scattering layer 13 in the form of a design and cooperates with the liquid crystal layer 11 to form optically variable Regions A and B as defined previously. In this example the matt varnish is applied during the lithographic printing of the substrate 16 and forms optically variable Region B in the form of the letter "L" which is registered to the letters "D" and "R" printed on the substrate 16 on either side of the security device 10 to form the identifying information "DLR". In a preferred embodiment the letters D and R can be printed in one of the colours of the liquid crystal layer 11 to further increase the link between the security device 10 and the substrate 16.

The example shown in FIG. 11 does not require the original security device 10 to be transferred to the security substrate 16 in register with any security features 17. However if the security device 10 comprises a patterned absorbing layer 12 in order to create optically variable Region C and/or visually distinct Region D, then it may be beneficial to register the designs defined by Regions C and D with the adjacent security features 17 on the substrate 16. One method of achieving this is to register the application of the original security device 10 such that the same region of the patterned absorbing layer 12 appears on every document formed from the substrate 16. The method for doing this will depend on the chosen method of incorporation into the substrate 16 for the liquid crystal layer 11, for example as a thread, stripe or patch etc.

One possible thread registration system, described in GB-A-235959, monitors the location of a control feature on a security element as it is being unwound and fed into the papermaking machine and a control feature on the substrate as it is formed. The system uses these position indicators to control the tension of the security element and rate of its embedment, so that the control features of the security element and substrate are in register.

The incorporation of a patch or stripe in register can be done using known registration systems to ensure that the device 10 is correctly placed on the substrate 16. An alternative method for registering the designs defined by Regions C and D with the adjacent security features 17 on the substrate 16 is to apply the absorbing layer 12 to the substrate 16 prior to the application of the liquid crystal layer 11. In the case of a surface applied stripe, this would remove the requirement for registration in the machine direction and therefore only require the rather more straightforward requirement of registration in the cross-direction.

Figure 12:
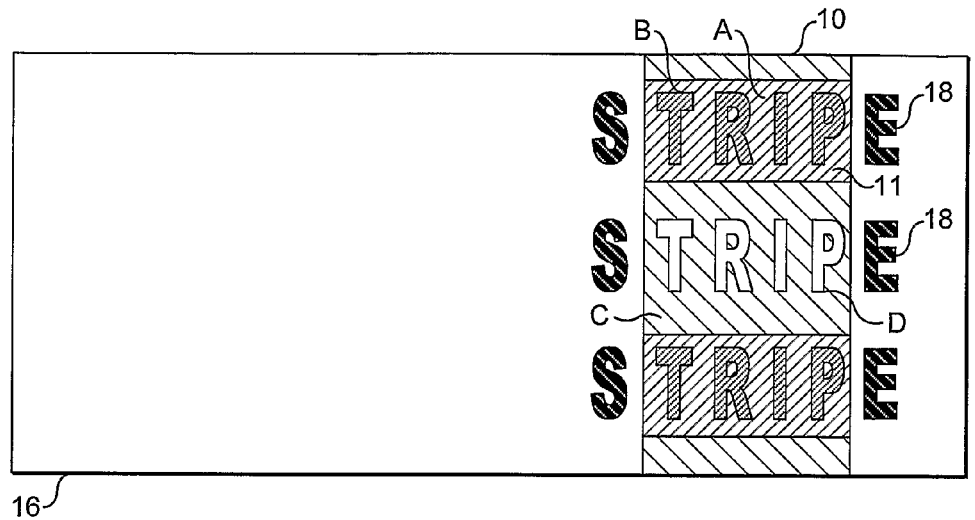

FIG. 12 shows one example where the customised images defined by optically variable Regions A, B, C, and D are registered to the traditional printing 18 on the security document. The matt varnish, which forms the scattering layer 13, is applied in the form of a design and cooperates with the liquid crystal layer 11 and the patterned absorbing layer 12 to form optically variable Regions A, B, and C and visually distinct Region D as defined previously. The dark absorbing layer 12 is applied in blocks along the device 10 defining Regions A and C. The matt varnish is applied during the lithographic printing of the substrate 16 and forms optically variable Regions B and D. Region B is formed within region A in the form of the letters "TRIP", which is registered to the letters "S" and "E" printed on either side of the security device 10 to form the word "STRIPE". Region D is formed within Region C in the form of the letters "TRIP" which is registered to the letters "S" and "E" printed on either side of the security device 10 to form the word "STRIPE". In addition to the different colourshifting effects exhibited by Regions A, B and C, the letters "TRIP" will disappear and reappear from view on tilting for reasons described with reference to FIGS. 5 and 6 (Region B) and FIGS. 9 and 10 (Region D).

A security device 10 of the type shown in FIG. 12 exhibits three anti-counterfeit aspects; multiple contrasting colourshifting regions, the disappearance and reappearance of an identifying image on tilting, and a registrational link between the images on the applied device 10 and the traditional printed images 18 on the adjacent regions of the substrate 16.

Figure 13A:
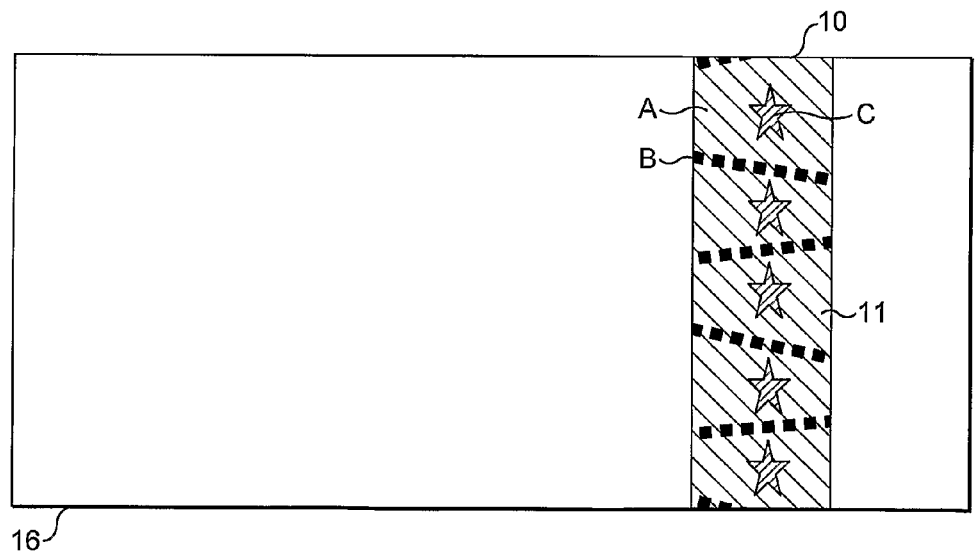
Figure 13B:
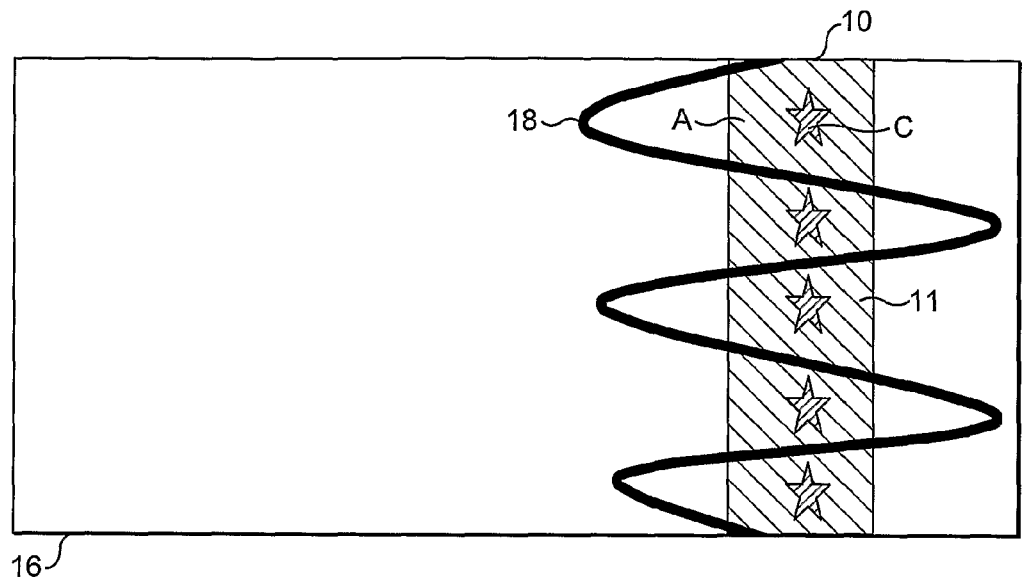

FIGS. 13a and 13b show one example where the customised images defined by optically variable regions A, B and C are registered to printing 18 on the security substrate 16. The scattering layer 13 is applied by a lithographic printing process to both the substrate 16 and the device 10 such that it forms a continuous pattern across the interface. In this example, the scattering layer 13 contains a fluorescent material such that a visible colour is observed when viewed under UV illumination. The pattern of the varnish over the liquid crystal layer 11 defines Region B. In addition the dark absorbing layer 12 is omitted from certain regions such that in Region C the liquid crystal layer 11 is over the plain substrate 16 defining the image of a star. Region A is the background. The security device 10 is applied in register to the substrate 16 such that the stars always fall in the same position on each document formed from the substrate 16 and the varnish is then applied to form a complementary design. On viewing the substrate 16 in normal illumination (FIG. 13a) three different colourshifting Regions A, B and C will be observed on the liquid crystal layer. When the substrate 16 is then viewed under UV illumination (FIG. 13b) a visible pattern will be observed to continue uninterrupted across the substrate 16 and the liquid crystal layer 11 in perfect registration, thereby providing a clear link between the liquid crystal layer 11 and the substrate 16 it is protecting.

In addition to a fluorescent material the scattering layer 13 may also comprise other functional materials that react to an external stimulus. Examples of such materials include, but are not limited to, phosphorescent, infrared absorbing, thermochromic, photochromic, magnetic, electrochromic, conductive and piezochromic materials.

In a further embodiment, the customisation of the security device 10 is effected by embossing the liquid crystal layer 11 with raised line structures. The embossing of raised line structures into the liquid crystal layer 11 is particularly advantageous because the facets generated by the embossing result in a change in the angle of incidence of the incoming light, generating facets of differing colours due to the fact that the colour of the liquid crystal layer 11 is dependent on the angle of view. The use of a raised line structure with a liquid crystal layer 11 enables the creation of localised regions exhibiting different colourshifts from the background layer 11.

For example if the liquid crystal layer 11 exhibits a green to blue colourshift then when viewed at normal incidence the embossed and non-embossed regions will appear green. On tilting the device 10, the non-embossed and embossed regions will change from green to blue at different angles of view as the device 10 is tilted. Furthermore if the device 10 comprises regions of different orientations of the embossed line structures then each region will change from green to blue at different angles of view as the device is tilted. Likewise by rotating the device 10 in the plane of the liquid crystal layer 11 the embossed regions will switch from green to blue or vice-versa at different points in the rotation as the orientation of the embossed structures varies relative to the observer.

A further advantage of using embossed raised line structures is that the structures have a raised surface that can be identified by touch. The smooth surface of the liquid crystal layer 11 further enhances the tactility of these raised structures.

The embossed line structures can take any convenient form including straight (rectilinear) or curved such as full or partial arcs of a circle or sections of a sinusoidal wave. The lines may be continuous or discontinuous and, for example, formed of dashes, dots or other shapes. By other shapes we mean the dots or dashes could have a graphical form. The line widths are typically in the range 10-500 microns, preferably 50-300 microns. Preferably, the individual lines are barely visible to the naked eye, the main visual impression being given by an array of multiple lines. The lines can define any shape or form, for example square, triangle, hexagon, star, flower or indicia such as a letter or number.

The embossed line structures are preferably formed by applying an embossing plate to the liquid crystal layer 11 under heat and pressure. Preferably the embossing process takes place during the intaglio printing process and is carried out using an intaglio plate having recesses defining the line structures. Preferably the liquid crystal layer 11 is blind embossed, i.e. the recesses are not filled with ink. However it is also possible that some of the recesses defining the embossed structure may be filled with ink and others left unfilled. Further intaglio printing or blind embossing may be carried out on regions of the substrate 16 adjacent to the liquid crystal layer 11 using the same intaglio plate so as to achieve precise registration between the different regions.

Figure 14:
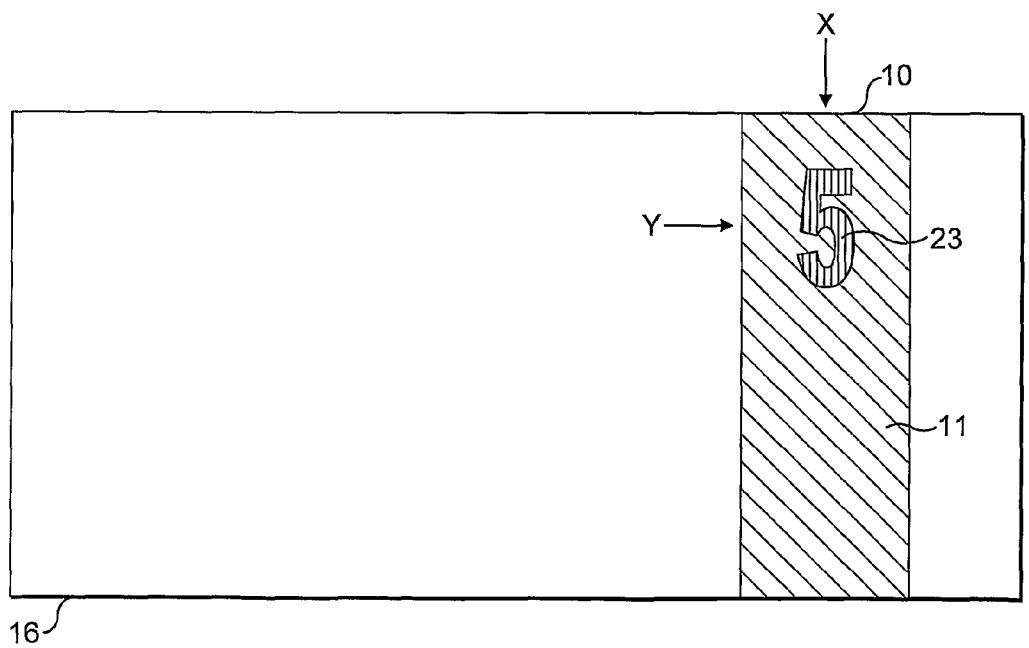

FIG. 14 shows an example of a security substrate 16 comprising a liquid crystal layer 11 which has been customised by embossing the film 11 after it has been applied to the base substrate 16. In this example a red-green colourshifting liquid crystal layer 11 is used, i.e. the film 11 appears red at normal incidence and shifts to green as the sample is tilted away such that the angle of view is away from normal incidence. The embossed line structures 23, formed by a respective set of substantially parallel raised lines, define the numeral "5". When viewed at normal incidence, both the embossed and non-embossed regions appear red.

On viewing along viewing direction Y such that the lines extend at 90° to the incident light direction, and tilting the substrate 16 away from normal incidence and parallel to direction Y, the numeral "5" switches almost instantaneously from red to a predominantly green colour due to the dominant reflected light arising from the edges of the raised lines. In contrast the non-embossed region switches from red to green at a greater angle of incidence relative to the flat substrate. The difference in the viewing angle at which the colour switch occurs arises because when viewed normally to the substrate the effective angle of incidence for light incident on the edge regions is greater than the angle of incidence for light incident on the flat non-embossed regions. If the device 10 is rotated by 90°, such that it is viewed along viewing direction x parallel to the direction of the embossed lines, then on tilting substrate 16, away from normal incidence and parallel to direction X, both the embossed and non-embossed regions switch from red to green at the same viewing angle because very little light is reflected by the edge of the lines.

If the embossed lines are such that a significant portion of the edge region extends at an angle of approximately 45° to the base substrate 16, then on tilting the substrate 16 away from normal incidence, and viewing perpendicularly to the direction of the lines, an almost instantaneous switch from red to a predominantly green colour will occur as described previously. However on tilting the substrate 16 further, the angle of incidence for the light incident on the edge regions will move closer to normal incidence resulting in a switch back to red, effectively exhibiting a reverse colourshift.

In a further embodiment the customisation of the security device 10 occurs by embossing the liquid crystal layer 11 with a non-diffractive line structure. A non-diffractive line structure is an example of a raised line structure which produces an optically variable effect when the angle of incidence light varies, but in which this effect is not caused by interference or diffraction. Security devices based on non-diffractive line structures are known in the prior art. For example WO-A-9002658 describes a security device in which one or more transitory images are embossed into a reflective surface. WO-A-9820382 discloses a further security device in which a group of elemental areas in which lines extend at different angles from each other form respective image pixels. U.S. Pat. No. 1,996,539 discloses a decorative device in which a relief structure is formed in a surface and has an optically variable effect. WO-A-2005080089 discloses a security device which has segments defined by line structures in a reflective portion of a substrate, which cause incident light to be reflected non-diffractively as the angle of incidence changes.

One example of a non-diffractive line structure 23 suitable for the present invention is described in WO-A-2005080089. WO-A-2005080089 describes a security device 10 comprising a substrate 16 having a reflective portion, which is provided with a raised line structure 23, the line structure 23 defining a plurality of segments, each segment being formed by a respective set of substantially parallel raised lines. The lines of at least three segments extend in different directions, wherein each segment causes incident light to be reflected non-diffractively in a variable manner as the angle of incidence changes. Thus, as the substrate 16 is tilted relative to the incident light and angle of view it will exhibit optically variable effects. The invention provides a security device 10 which presents a moving effect viewable across a wide range of angles. It is simple to authenticate yet difficult to counterfeit.

Figure 15:
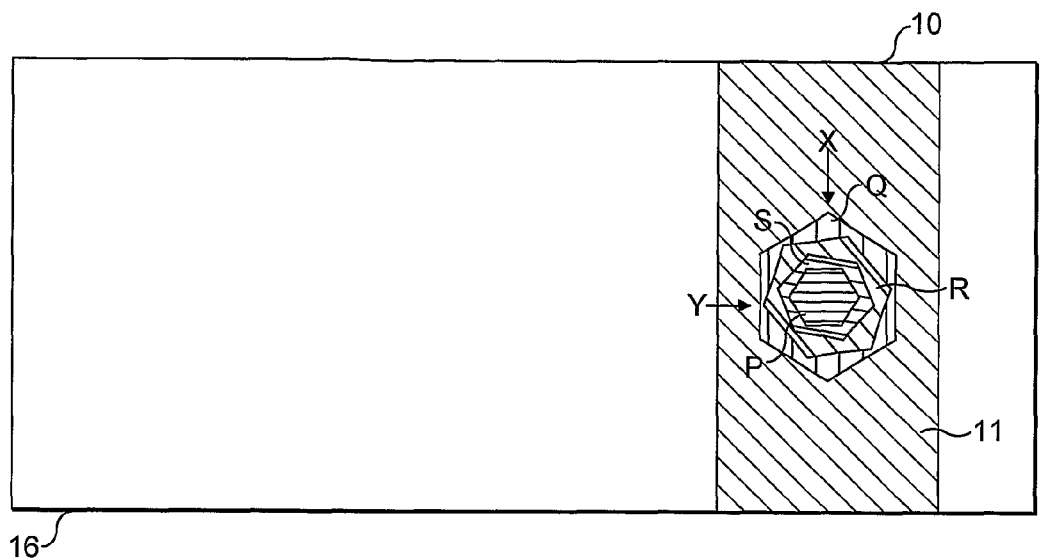

If the reflective portion of the device 10 in WO-A-2005080089 comprises a liquid crystal layer 11, then the different segments will exhibit regions of different colour and exhibit different colourshifts on tilting and rotating the device 10. FIG. 15 shows an example of such a device 10 where a red-green colourshifting liquid crystal layer 11 is customised by embossing segments P, Q, R, and S. When viewed at normal incidence all the segments P, Q, R, S and the non-embossed areas appear red irrespective of the line direction within the segment P, Q, R, S. On tilting the device 10 away from normal incidence parallel to viewing direction x (relative to the flat substrate), and viewing along viewing direction X, the segments P, where the lines extend at 90° to the incident light direction, switch almost instantaneously to green due to the dominant reflected light arising from the edges of the raised lines. In contrast, segment Q, where the lines extend parallel to the incident light direction, switches from red to green at a greater angle of incidence (relative to the flat substrate) than segment P and similar to the switch angle of the non-embossed areas because very little light is reflected by the edge of the lines. Segments R and S, with line orientations between these two directions, will switch from red to green at angles of incidence in-between these two extremes. If the device 10 is rotated by 90° such that it is viewed along viewing direction Y, and tilted away from normal incidence parallel to viewing direction Y, then angles of incidence at which the colourshift occurs in segments P and Q when viewed along viewing direction X will be reversed.

The device 10 in FIG. 15 exhibits variable colourshifting regions which change colour at different angles of view. Furthermore, for a given viewing condition the device will exhibit regions at different stages of the colourshifting process. For example, at one viewing condition, segment Q will appear red, segment P will appear green and segments R and S will exhibit different intermediate tones between red and green.

In addition to the different colour-shifting regions, the device 10 will also display the optically variable effects as defined in WO-A-2005080089. When viewed along viewing direction X, segments P appear bright because the lines in these segments P extend at or near 90° to the incident light direction. When the device 10 is rotated so that the incident light direction is in viewing direction Y, segments Q appear bright. For viewing direction in between these two extremes some of the segments appear bright, while the remaining segments appear dark. Again, this brightness depends upon how close the lines defining the segment extend at 90° to the incident light direction. This provides a security device 10 which presents a moving effect viewable across a wide range of angles.

Figure 16:
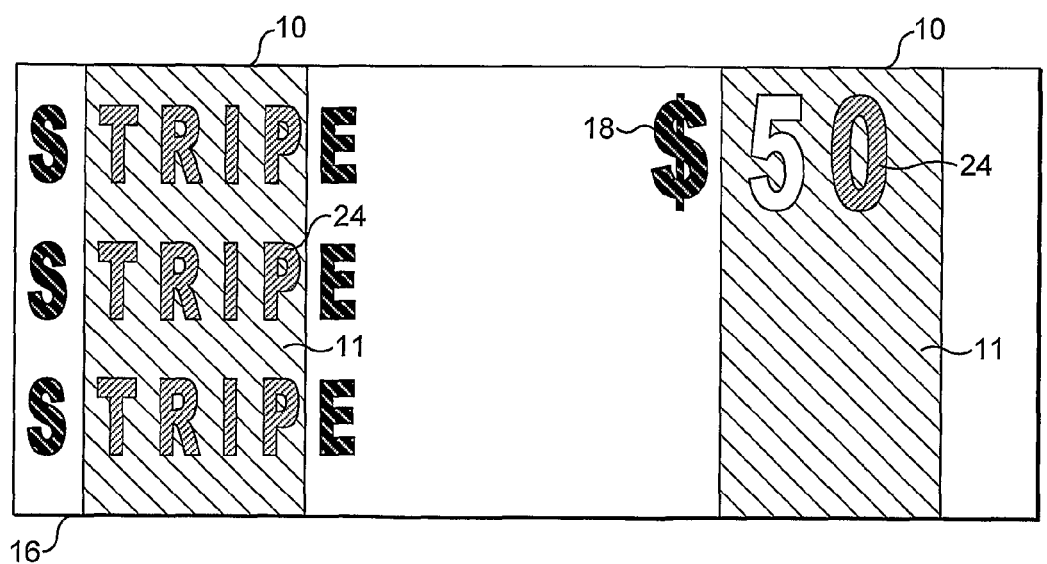

FIG. 16 shows two examples where a liquid crystal layer 11, in the form of a stripe, has been embossed post application to a substrate 16, such that the design of the emboss links in to other images on the liquid crystal layer 11 and/or the substrate 16. On the left hand side of the substrate 16 shown in FIG. 16 a blind embossing 24 of the liquid crystal layer 11 during the intaglio printing forms the letters "TRIP" and this is registered to the letters "S" and "E" printed on either side of the film 11 during the same intaglio printing process to form the word "STRIPE".

On the right hand side of the substrate 16 shown in FIG. 16, the numeral "5" is formed within the liquid crystal layer 11 by omitting the dark absorbing layer 12 and the numeral "0" is formed by a blind embossing 24 of the liquid crystal layer 11 during the intaglio printing process. In addition a "$" symbol 18 is printed during the same intaglio printing process. The incorporation of the security device 10 and the subsequent intaglio printing process are controlled such that the "5", "0" and "$" combine to display the denomination of the banknote "$50".

Figure 17:
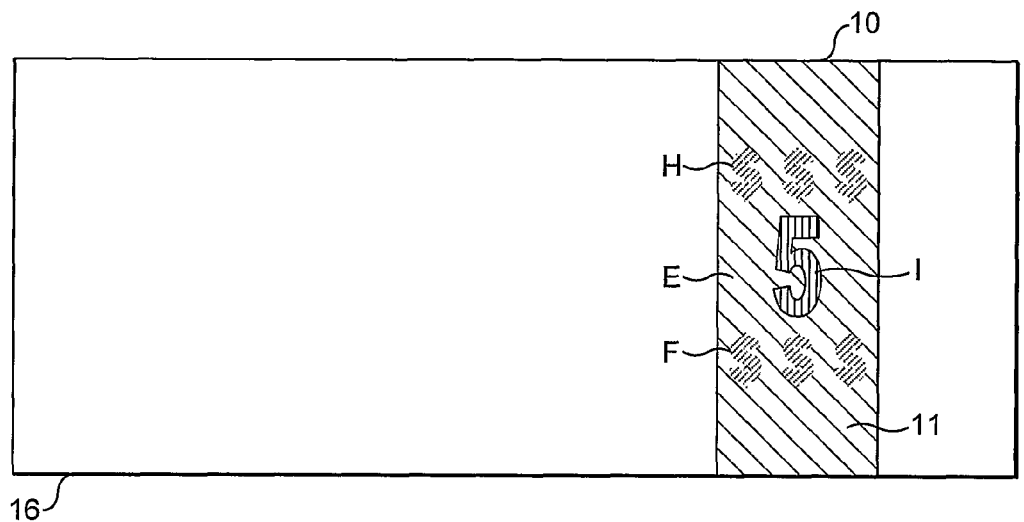

In a further embodiment the customisation of the security device 10 is achieved using a combination of the methods described in FIGS. 5 to 16. In this manner the security device 10 will comprise multiple customised regions each with a contrasting appearance to the other customised regions and the non-customised liquid crystal layer. FIG. 17 illustrates an example of a security device 10 which has been customised in region H to form a series of "$" symbols by the application of a customising region 13 in the form of a light scattering matt varnish and customised in region I to form the numeral "5" by the embossing of a raised line structure. If the secure document, to which the security device 10 is applied, is a banknote then both of these customisation processes can easily be integrated into the standard printing processes for banknotes.

The matt varnish can be applied using one of the printing units of a lithographic press and the raised line structure can be formed by carrying out a blind embossing operation during the intaglio printing stage.

The designs formed by the multiple customisation processes can be correlated and registered to each other and also correlated and registered to images and designs generated by the standard security printing processes.

The invention claimed is:

1. A method of forming a security device in which a liquid crystal material is applied to a carrier substrate to form a liquid crystal layer, said method comprising the following steps:

applying an at least partially absorbing layer co-extensive with or to at least a part of one side of the liquid crystal layer;

applying an adhesive layer to the absorbing layer;

transferring the partially formed security device to a base substrate so that it is adhered thereto by the adhesive layer;

removing the carrier substrate leaving a surface of the liquid crystal layer exposed; and applying at least one customising region co-extensive with or to at least a part of the exposed surface of the liquid crystal layer in selected regions, said at least one customising region having non-colourshifting properties modifies the colour shifting properties of the liquid crystal layer to provide at least one optically variable region covered by the at least one customising region which contrasts with at least one other optically variable region not covered by the at least one customising region, the at least one customising region modifies the colour shifting properties of the liquid crystal layer by changing the angle at which the colourshift is perceived and the modification of the colourshifting properties is apparent to an observer as a change in an angle of view at which different colours of reflected light are observed.

2. The method of forming a security device according to claim 1 wherein the at least one customising region is at least semi-transparent.

3. The method of forming a security device according to claim 1 including the step of applying the at least one customising region in the form of a design.

4. The method of forming a security device according to claim 3 wherein the design(s) of the at least one customising region and/or absorbing layer comprise(s) images, patterns, symbols, alphanumeric characters and/or combinations thereof.

5. The method of forming a security device according to claim 3 including the step of positioning the at least one customising region and the absorbing layer relative to each other such that the combination of the contrasting regions creates at least one design, said at least one design being a pattern, symbol, alphanumeric or a combination of thereof.

6. The method of forming a security device according to claim 3 wherein the at least one customising region comprises a functional material which reacts to an external stimulus.

7. The method of forming a security device according to claim 6 wherein the functional material includes of a fluorescent, phosphorescent, infrared absorbing, thermochromic, photochromic, magnetic, electrochromic, conductive and piezochromic characteristic.

8. The method of forming a security device according to claim 1 having a raised line structure being in the form of an optically variable non-diffractive line structure.

9. The method of forming a security device according to claim 8 wherein the raised line structure defines a plurality of segments, each segment being formed by a respective set of substantially parallel raised lines, the lines of at least two segments extending in different directions, thereby providing at least three optically variable regions.

10. The method of forming a security device according to claim 9 wherein the at least three regions exhibit the same colourshift, which occurs at different angles of view.

11. The method of forming a security device according to claim 1 including the step of overlapping the at least one customising region partially over the absorbing layer, leaving some regions of the absorbing layer not overlapped by the at least one customising region to provide at least three optically variable regions.

12. The method of forming a security device according to claim 11 wherein the at least three optically variable regions are contrasting colourshifting regions.

13. The method of forming a security device according to claim 12 including the step of overlapping the at least one customising region with the blank areas in the absorbing layer, thereby reducing the optically variable effect of the liquid crystal layer.

14. The method of forming a security device according to claim 1 wherein the absorbing layer is coloured.

15. The method of forming a security device according to claim 1 wherein the absorbing layer is a substantially totally absorbing layer.

16. The method of forming a security device according to claim 1 wherein the absorbing layer is black.

17. The method of forming a security device according to claim 1 wherein the absorbing layer comprises a combination of colours.

18. The method of forming a security device according to claim 1 wherein the absorbing layer comprises a pigmented ink or coating.

19. The method of forming a security device according to claim 1 wherein the absorbing layer comprises a non-pigmented absorbing dark dye.

20. The method of forming a security substrate comprising a security device according to claim 1 wherein the security substrate being at least one of a security substrate applied to a base substrate and a security substrate incorporated into a base substrate.

21. The method of forming a security substrate according to claim 20 wherein a design of at least one of the at least one customising region and absorbing layer comprises one or more image, pattern, symbol, and alphanumeric character which are formed in register with printed features on the substrate.

22. The method of forming a security substrate according to claim 20 including the step of applying the absorbing layer to the base substrate.

23. The method of forming a security substrate according to claim 20 including the step of applying the security device as at least one of a patch, foil and stripe to a surface of the base substrate.

24. The method of forming a security substrate according to claim 20 including the step of incorporating the security device in a base substrate as an elongate security element.

25. The method of forming a security substrate according to claim 24 wherein the elongate security element is at least partially visible in windows in at least one surface of the substrate.

26. A method as claimed in claim 1 in which the at least one customising region is formed by embossing the exposed surface of the liquid crystal layer.

27. A method as claimed in claim 26 in which the embossing is formed by an intaglio printing process.

28. A method as claimed in claim 27 in which the intaglio printing process forms raised line structures in the surface of the substrate.

29. A method as claimed in claim 27 in which the print process forming the at least one customising region is also applied to a surface of the security substrate to form a continuous pattern across the security substrate.

30. A method as claimed in claim 1 in which the at least one customising region is applied by coating or printing the exposed surface of the liquid crystal layer with a matt lacquer or varnish.

31. A method as claimed in claim 1 in which the at least one customising region is applied simultaneously with security print to a surface of the security substrate.

32. A security device, said device comprising:
a liquid crystal layer;
an at least partially absorbing layer co-extensive with or applied to at least a part of one side of said liquid crystal layer; and
at least one customizing region co-extensive with or applied to at least a part of an opposite side of said liquid crystal layer to said absorbing layer in selected regions, the customizing region includes a scattering layer having non-color properties for reducing gloss from the liquid crystal layer by scattering reflected light from the liquid crystal to change an angular range from which a color shift can be observed by an observer and to provide at least one optically variable region covered by said at least one customizing region which contrasts with at least one other optically variable region not covered by said at least one customizing region, wherein said at least one customizing region modifies the color shifting properties of the liquid crystal layer by changing the angle at which the color shift is perceived.

33. A security device as claimed in claim 32 in which the light scattering region is a matt varnish or lacquer.

34. A security device as claimed in claim 32 in which the light scattering region comprises a suspension of fine particles in an organic resin.

35. A security device as claimed in claim 32 in which the light scattering region comprises an organic wax.

36. A security device as claimed in claim 32 in which the light scattering region comprises a matt structure embossed in the surface of the liquid crystal layer.

* * * * *